United States Patent [19]

Takahashi

[11] 4,446,755
[45] May 8, 1984

[54] AIR BREATHER DEVICE OF AN AUTOMOTIVE MANUAL TRANSMISSION

[75] Inventor: Kotei Takahashi, Yokohama, Japan

[73] Assignee: Nissan Motor Company, Ltd., Yokohama, Japan

[21] Appl. No.: 350,390

[22] Filed: Feb. 19, 1982

[30] Foreign Application Priority Data

Feb. 20, 1981 [JP] Japan .................................. 56-22889

[51] Int. Cl.³ ............................................. F16H 57/02
[52] U.S. Cl. ............................... 74/606 R; 192/113 A
[58] Field of Search ............... 192/113 A, 113 R, 115, 192/30 R; 74/606 A, 606 R; 188/264 A, 71.6; 220/366, 374; 123/41.86

[56] References Cited

U.S. PATENT DOCUMENTS

| 1,529,936 | 3/1925 | Tinniswood | 74/606 R X |
| 1,595,020 | 8/1926 | Nadler | 74/606 R |
| 1,761,929 | 6/1930 | McCuen | 123/41.86 |
| 3,809,280 | 5/1974 | Park et al. | 220/366 X |
| 4,151,761 | 5/1979 | Nishikawa et al. | 74/606 A |
| 4,382,497 | 5/1983 | Sakai et al. | 192/113 A |

FOREIGN PATENT DOCUMENTS 2458047 10/1980 Fed. Rep. of Germany .

Primary Examiner—Rodney H. Bonck
Attorney, Agent, or Firm—Lowe, King, Price & Becker

[57] ABSTRACT

In a transmission including a transmission housing and a clutch cover which are coupled with each other by sealingly contacting their respective mating flange portions, there is provided an air breather device which comprises a first rib formed on the transmission housing to form near the mating flange portion of the housing a first recess, a second rib formed on the clutch cover to form near the mating flange portion of the casing a second recess, the first and second ribs being sealingly contacted at their tops with each other to merge the first and second recesses to form a chamber upon coupling the transmission housing and the clutch cover, first means defining in the first and second ribs respective cuts which constitute, upon coupling the transmission housing and the clutch cover, independent openings through which the interior of the chamber is communicated with the interior of the transmission housing, and second means communicating the interior of the chamber with the outside of the transmission housing.

5 Claims, 4 Drawing Figures

AIR BREATHER DEVICE OF AN AUTOMOTIVE MANUAL TRANSMISSION

BACKGROUND OF THE INVENTION

1. Field of the Invention

The present invention relates in general to an air breather device of an automotive transmission, and more particularly to an air breather device of an automotive manual transmission adaptable for use in a front-wheel-drive automotive vehicle having a transverse mounted engine.

2. Description of the Prior Art

In order to keep the inside pressure of the transmission at atmospheric level, a so-called air breather device is mounted to the transmission, which permits introduction of ambient air into the transmission open air or air discharge from the transmission into the air in accordance with the pressure difference created between the inside of the transmission and the ambient air.

In conventional air breather devices, an arrangement is usually employed in which a cover covering an open end of the transmission housing is formed with a recess facing toward the inside of the housing. A breather port is formed in the cover to communicate the recess with ambient air, and a separate plate partially covers the recess thereby permitting the inside of the recess (breather chamber) to communicate with the inside of the transmission housing through the remaining open section of the recess. Thus, under operation, the air breathing is carried out through the breather port, the breather chamber and the remaining open section.

In this type air breather device, however, mounting of the separate plate to the recess requires troublesome positioning work and in addition to this, the lubricant oil in the housing tends to form its film on the recess because of its inherent construction, causing malfunction of the device, so that it often happens that the lubricant oil in the transmission housing is blown off through the device.

SUMMARY OF THE INVENTION

Therefore, it is an object of the present invention to provide an improved air breather device of an automotive manual transmission, free of the above-mentioned drawbacks.

According to the present invention, there is provided, in a transmission including a transmission housing and a clutch cover which are coupled with each other by sealingly contacting their respective mating flange portions, an air breather device which comprises a first rib integrally formed on the transmission housing to form in the vicinity of the mating flange portion of the transmission housing a first recess which faces toward the clutch cover; a second rib integrally formed on the clutch cover to form in the vicinity of the mating flange portion of the clutch cover a second recess which faces toward the transmission housing, the first and second ribs being sealingly contacted at their tops with each other to merge the first and second recesses thereby to form a single chamber upon coupling the transmission housing and the clutch cover; first means defining in the first and second ribs respective cuts which constitute, upon coupling the transmission housing and said clutch cover, independent openings through which the interior of the single chamber communicates with the interior of the transmission housing; and second means communicating the interior of the single chamber with the outside of the transmission housing.

DETAILED DESCRIPTION OF THE INVENTION

Figure 1:
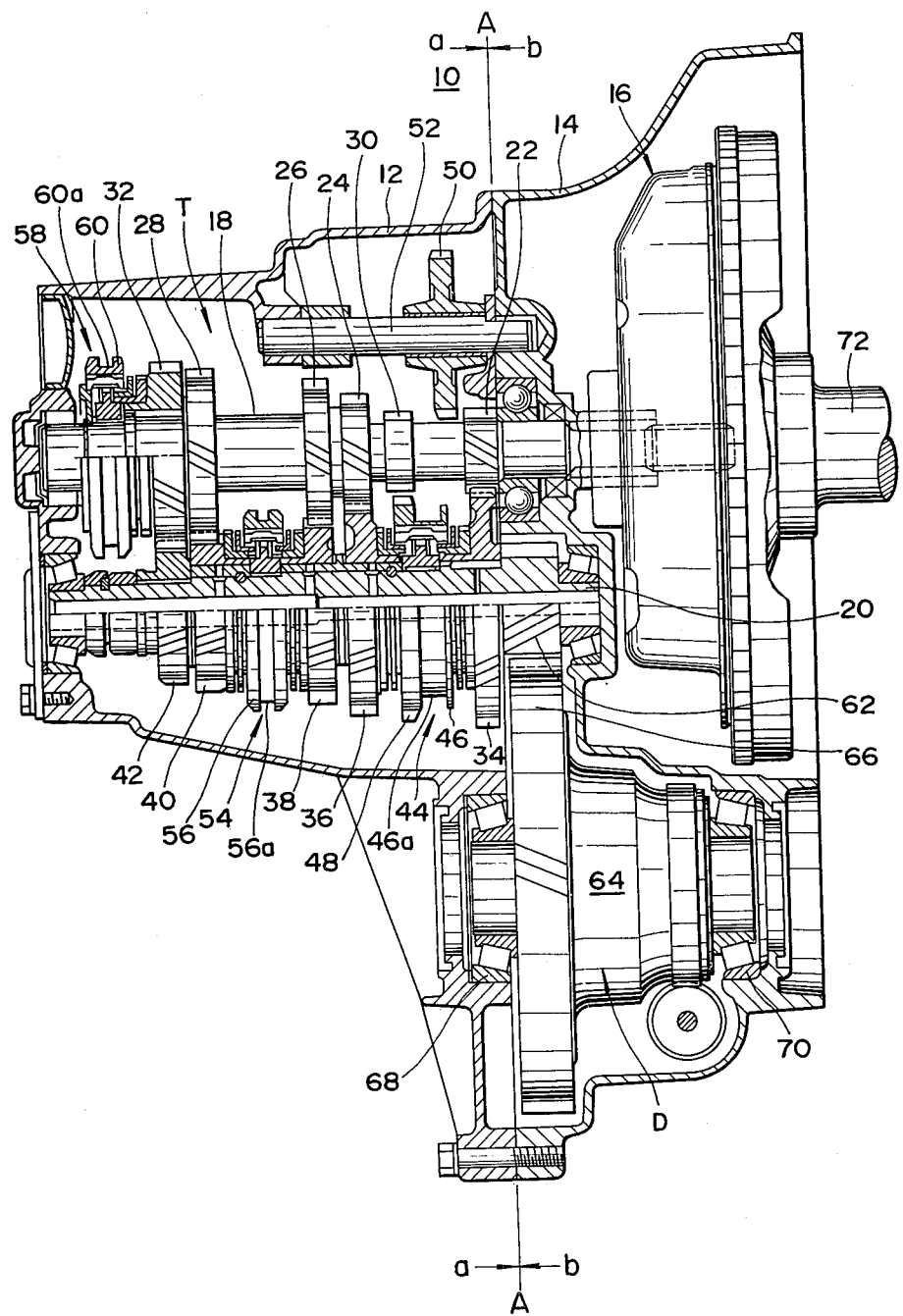
FIG. 1 is a longitudinal section view of a manual transmission equipped with an air breather device according to the present invention, some parts being shown dislocated for clarification of the drawings.

Referring to FIG. 1, there is shown generally a transaxle assembly 10 adapted for use in a front-wheel-drive motor vehicle having a transversely mounted engine, in which assembly an air breather device of the present invention is incorporated. The transaxle assembly 10 is a single unit including a transmission T and a differential gear D as shown.

The transaxle assembly 10 comprises a transmission housing 12 and a cover 14 which covers an open end of the transmission housing 12. The cover 14 constitutes a housing for a clutch 16 and acts as a supporter for the differential gear D, as shown.

Within the housing 12, there are arranged in parallel an input shaft 18 and an output shaft 20 rotatable about the respective axes thereof relative to the housing. The input shaft 18 is adapted to receive torque from the engine through the clutch 16. Defined by or secured to the input shaft 18 are a first speed input gear 22, a second speed input gear 24, a third speed input gear 26, a fourth speed input gear 28 and a reverse input gear 30. A fifth speed input gear 32 is journalled on the input shaft 18. Journalled on the output shaft 20 are a first speed output gear 34, a second speed output gear 36, a third speed output gear 38 and a fourth speed output gear 40 which are constantly meshed with the first, second, third and fourth speed input gears 22, 24, 26 and 28, respectively. A fifth speed output gear 42 is splined to the output shaft 20 and constantly meshed with the fifth speed input gear 32.

A first-second synchronizing clutch mechanism 44 is slidably supported on the output shaft 20, which functions to smoothly connect either the first speed output gear 34 or the second speed output gear 36 to the output shaft 20 thereby to establish the first or second forward gear ratio. A coupling sleeve 46 of the mechanism 44 is formed at its periphery with a reverse idler gear 48 which is meshingly engageable with the reverse input gear 39 through a reverse idler gear 50 (which is shown dislocated in FIG. 1 for clarification of the drawing). The reverse idler gear 50 is rotatably and axially slidably mounted on a stationary shaft 52 which is parallel to the input and output shafts 18 and 20.

A similar third-fourth synchronizing clutch mechanism 54 is slidably supported on the output shaft 20, which functions to smoothly connect either the third speed output gear 38 or the fourth speed output gear 40 to the output shaft 20 thereby to establish the third or fourth forward gear ratio. Designated by numeral 56 is a coupling sleeve of the mechanism 54 which is shiftable rightward and leftward in FIG. 1.

A fifth synchronizing clutch mechanism 58 is slidably supported on the input shaft 18 for smoothly connecting the fifth speed input gear 32 to the input shaft 18 thereby to establish the fifth forward gear ratio. In particular, when a coupling sleeve 60 of this mechanism 58 is shifted rightward in FIG. 1, the fifth speed input gear 32 meshing with the fifth speed output gear 42 enters into driving connection with the input shaft 18.

A drive pinion 62 is defined by or secured to the output shaft 20. The drive pinion 62 meshes with a ring gear 66 secured to a casing 64 of the differential gear D thereby to constitute a final drive mechanism. The differential gear casing 64 is rotatably supported at both axial ends thereof by the housings 12 and 14 through thrust bearings 68 and 70 which are mounted in the housings 12 and 14, respectively. Although not shown in the drawing (FIG. 1), a pair of road wheel driving shafts are inserted at their inside ends into the casing 64 from the axial ends of the casing and respectively engaged with side gears (not shown) of the differential gear D.

In the above-described construction, the engine output which is transmitted from an engine crank shaft 72 to the input shaft 18 through the clutch 16 rotates the first, second, third and fourth speed output gears 34, 36, 38 and 40 through the first, second, third and fourth speed input gears 22, 24, 26 and 28. However, as far as the coupling sleeves 46, 56 and 60 and the reverse idler gear 50 take the respective rest positions as shown in FIG. 1, the engine power is not transmitted to the output shaft 20 thereby keeping the transmission T in a neutral or rest condition.

When the coupling sleeve 46 is shifted rightward in FIG. 1, the first speed output gear 34 meshing with the first speed input gear 22 drives the output shaft 20, so that engine power is transmitted to the driving wheels (not shown) through the first speed input gear 22, the first speed output gear 34, the drive pinion 62, the ring gear 66 and the differential gear D thereby to establish a first forward gear ratio. Similar to this, when the coupling sleeve 46 is shifted leftward, a second forward gear ratio is established.

When the coupling sleeve 56 is shifted rightward in FIG. 1, the third speed output gear 38 meshing with the third speed input gear 26 drives output shaft 20 to establish a third forward gear ratio, while, when the coupling sleeve 56 is shifted leftward, the fourth speed output gear 40 meshing with the fourth speed input gear 28 drives connection with the output shaft 20 thereby to establish a fourth forward gear ratio.

When the coupling sleeve 60 is shifted rightward in FIG. 1, the fifth speed input gear 32 meshing with the fifth speed output gear 42 drives the input shaft 18 to be rotatable therewith, so that the engine power is transmitted to the driving wheels through the fifth speed input gear 32, the fifth speed output gear 42 splined to the output shaft 20, the drive pinion 62, the ring gear 66 and the differential gear D thereby to establish a fifth forward gear ratio.

When the reverse idler gear 50 is shifted leftward in FIG. 1 to engage with both the reverse input gear 30 and the reverse output gear 48, the engine power is transmitted to the driving wheels through the reverse input gear 30, the reverse idler gear 50, the reverse output gear 48, the drive pinion 62, the ring gear 66 and the differential gear D thereby to establish a reverse condition.

The air breather device of the present invention is described in detail below.

Figure 2:
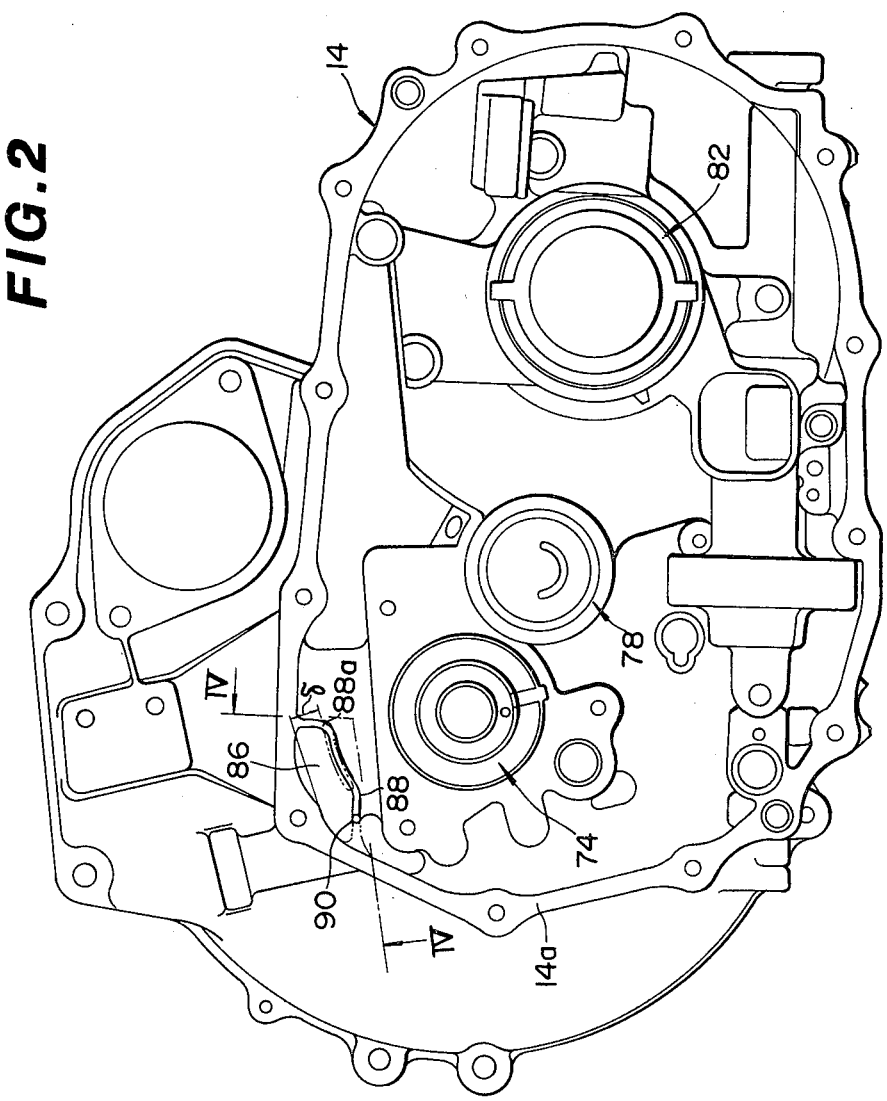
FIG. 2 is a view taken along the line A—A of FIG. 1 from the direction of the arrows a, showing a side view of the cover.
Figure 3:
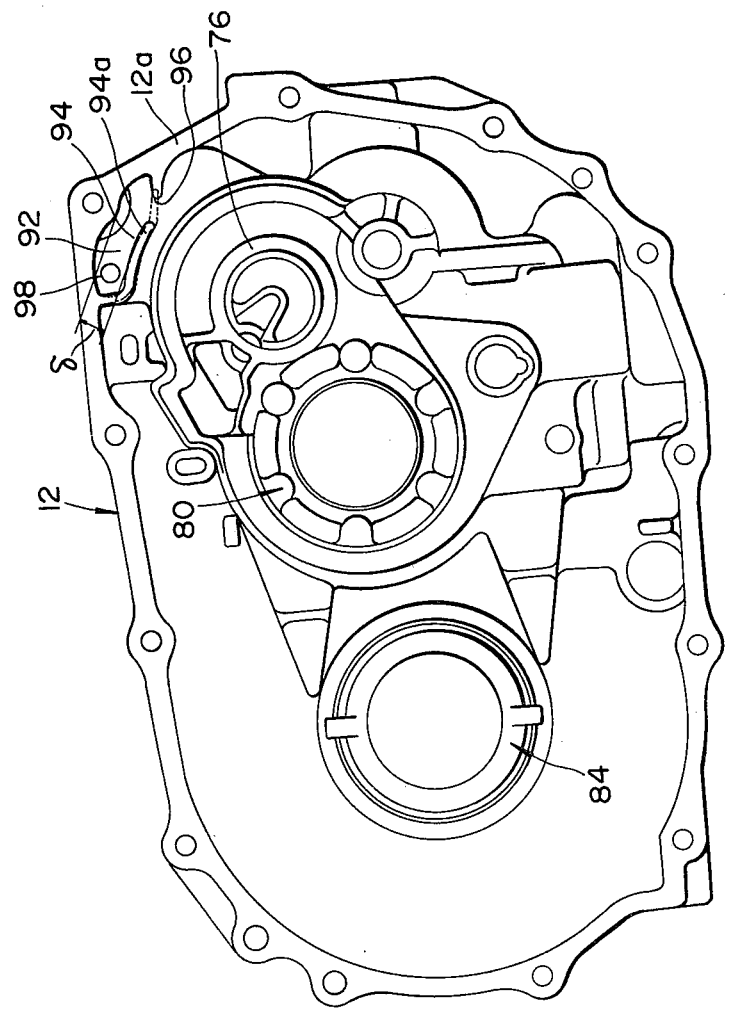
FIG. 3 is a view taken along the line A—A of FIG. 1 from the direction of the arrows b, showing a side view of the transmission housing.

Referring to FIG. 2, there is shown a view taken along the line A—A of FIG. 1 from the direction of the arrows a, showing an inside view of the cover 14. FIG. 3 is a view taken along the same line from the direction of the arrows b, showing an inside view of the transmission housing 12. In these drawings, denoted by numerals 74 and 76 are respective bearing portions for the input shaft 18, numerals 78 and 80 are respective bearing portions for the output shaft 20, and numerals 82 and 84 are respective bearing portions for the casing 64 of the differential gear D. Further, denoted by numerals 14a and 12a are respective mating flange portions of the cover 14 and the transmission housing 12, which are mated with each other upon coupling to cover 14 with the housing 12.

As will become clear as the description proceeds, the air breather device of the present invention comprises first and second constructional parts which are respectively and integrally formed on the cover 14 and the transmission housing 12 by monobloc casting. Upon coupling, the first and second constructional parts make up the air breather device.

As is seen from FIG. 2, the first constructional part comprises a recess 86 positioned in the vicinity of a corner of the mating flange portion 14a. It should be noted that the recess 86 is located far from a gear (in the embodiment, the gear is the final drive ring gear 66) which pumps up the lubricant oil in the transmission housing 12, and positioned at a place higher than the level of the lubricant oil reserved in the housing 12. The recess 86 is defined by a rib 88 which extends from a portion of the mating flange portion 14a to another portion of the same. The top surface 88a of the rib 88 is flat and is flush with the surface of the mating flange portion 14a therethroughout. The rib 88 has a cut 90 which extends from the flat top surface of the rib 88 toward the base of the same to form a short channel.

As is seen from FIG. 3, the second constructional part comprises a recess 92 which has a reversed shape with respect to the above-mentioned recess 86 and is formed on the transmission housing 12 at a portion which mated with the recess 86 when the cover 14 is coupled with the housing 12. The recess 92 is defined by a rib 94 which extends from a portion of the mating flange portion 12a to another portion of the same. Similar to that of the first constructional part, the top surface 94a of the rib 94 is flat and is flush with the surface of the mating flange portion 12a of the housing 12 therethroughout, and the rib 94 has a cut 96 which extends from the flat top surface of the rib 94 toward the base of the same to form a short channel. For the reason which will become clear hereinafter, the cut 96 is located at a portion other than the portion corresponding to the portion where the cut 90 of the first constructional part is located. A breather port 98 is formed in the transmission housing 12 to communicate the recess 92 with the open air. If desired, a filter (not shown) may be set in the breather port 98 for filtering air flowing therethrough.

Upon coupling the cover 14 and the transmission housing 12 by mating the flange portion 14a of the cover 14 with that of the housing 12, the recesses 86 and 99 are merged with each other and the flat top surface 88a and 94a of the ribs 88 and 94 are sealingly contacted with each other as is shown by phantom lines in respective drawings (FIGS. 2 and 3).

Figure 4:
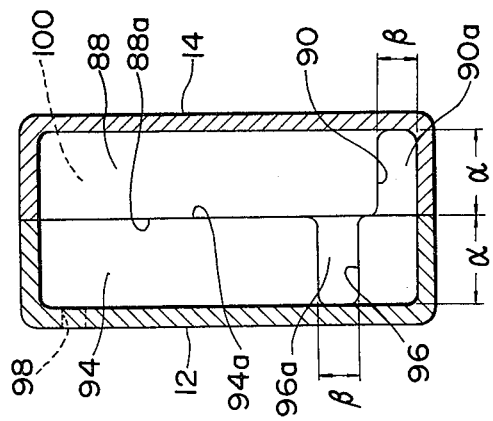
FIG. 4 is a view taken along the line IV—IV of FIG. 2 at a condition in which the transmission housing and the cover are coupled.

With this coupling, a breather chamber 100 is made up which includes the merged recesses 86 and 92 as is shown in FIG. 4. With the presence of the non-aligned cuts 90 and 96 at the respective ribs 88 and 94, two independent openings 90a and 96a are formed through which the breather chamber 100 communicates with the interior of the transmission housing 12 and thus with that of the cover 14.

If each cut 90 and 96 has a rectangular shape as in the case of the disclosed embodiment, the length $\alpha$ and the width $\beta$ thereof are not less than 15 mm and 7 mm, respectively. Further, the width $\delta$ (see FIGS. 2 and 3) of the recess 86 or 92 is not less than 10 mm. Experimentation has revealed that when the cuts 90 and 96 and the recesses 86 and 96 satisfy the above-mentioned dimensional conditions, the undesired phenomenon in which the openings 90a and 96a are covered with the film of the lublicant oil hardly occurs. In fact, because of the independence of the openings 90a and 96a, at least one of them remains uncovered with the oil film or open even when the inside of the transmission housing 12 is in a critical condition to form a film on the openings 90a and 96a. Thus, air breathing between the interior of the transmission housing 12 and the open air is assurely carried out during the operation of the transmission.

Experimentation has further revealed that even if one of the openings 90a and 96a forms thereon the oil film collecting a considerable amount of oil on it, the film breaks instantly thereby preventing the oil from being discharged into the open air.

Since substantially all parts of the air breather device are integrally formed on the transmission housing 12 and the cover 14 and they make up automatically the finished air breather device upon coupling the cover and the transmission housing, formation of the air breather device does not affect the assembling procedure of the transmission.

What is claimed is:

1. In a transmission including a transmission housing and a clutch cover which are coupled with each other by sealingly contacting their respective mating flange portions, an air breather device comprising:
   a first rib integrally formed on said transmission housing to form in the vicinity of the mating flange portion of the transmission housing a first recess which faces toward said clutch cover;
   a second rib integrally formed on said clutch cover to form in the vicinity of the mating flange portion of the clutch cover a second recess which faces toward said transmission housing, said first and second ribs being sealingly contacted at their tops with each other to merge said first and second recesses thereby to form a chamber upon coupling said transmission housing and said clutch cover;
   first means defining in said first and second ribs respective cuts which constitute, upon coupling said transmission housing and said clutch cover, independent openings through which the interior of said chamber is communicated with the interior of said transmission housing; and
   second means communicating the interior of said chamber with the outside of said transmission housing.

2. An air breather device as claimed in claim 1, in which the top of each rib is flat and is flush with the mating surface of the corresponding mating flange portion.

3. An air breather device as claimed in claim 2, in which the cut of each rib extends from the flat top surface toward the base of the rib to form a channel.

4. An air breather device as claimed in claim 3, in which the respective cuts of said first and second ribs are spaced from each other upon completion of mating between said first and second ribs.

5. An air breather device as claimed in claim 4, in which said second means comprises a through port which is formed in said transmission housing to communicate the interior of said chamber with the open air.

* * * * *